US006332263B1

United States Patent
Schmidt et al.

(10) Patent No.: US 6,332,263 B1
(45) Date of Patent: Dec. 25, 2001

(54) METHOD OF PRODUCING A ROTOR FOR A COMMUTATOR MACHINE USING AN ANGLED SONOTRODE

(75) Inventors: Ralf Schmidt, Renchen; Hans Kobschaetzky, Sachsenheim, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/423,734

(22) PCT Filed: Dec. 10, 1998

(86) PCT No.: PCT/DE98/03626

§ 371 Date: Nov. 12, 1999

§ 102(e) Date: Nov. 12, 1999

(87) PCT Pub. No.: WO99/46834

PCT Pub. Date: Sep. 16, 1999

(30) Foreign Application Priority Data

Mar. 12, 1998 (DE) .............................................. 198 10 621

(51) Int. Cl.[7] ..................................................... H02K 13/02
(52) U.S. Cl. ............................ 29/597; 310/235; 310/236
(58) Field of Search .................................... 310/234, 235, 310/236, 237; 29/597, 733

(56) References Cited

U.S. PATENT DOCUMENTS 1,894,723 * 1/1933 Apple .................................. 310/234
2,831,991 * 4/1958 Perkins ................................ 310/234
3,519,863 * 7/1970 Ambler et al. ....................... 310/234
4,521,710 * 6/1985 Mabuchi ............................. 310/234
5,012,149 * 4/1991 Strobl ................................. 310/234
5,019,740 * 5/1991 Altpeter et al. ...................... 310/234
5,029,746 * 7/1991 Altpeter et al. ...................... 228/1.1
5,057,661 * 10/1991 Banner ............................. 219/56.22
5,418,265 * 5/1995 Matsuzaki et al. ................. 523/440

FOREIGN PATENT DOCUMENTS 44 10 218 * 9/1995 (DE) .................................... 310/234
163675 * 12/1921 (GB) .................................. 310/234
10-257736 * 9/1998 (JP) .................................... 310/234
10-271769 * 10/1998 (JP) .................................... 310/234

OTHER PUBLICATIONS

Abstract of Japanese Patent 61–085,037, Apr. 1986.*

* cited by examiner

*Primary Examiner*—Karl Tamai
(74) *Attorney, Agent, or Firm*—Ronald E. Greigg

(57) ABSTRACT

A rotor for a commutator machine, having a rotor shaft, a rotor body containing a rotor winding, and a commutator, which has an insulation material body non-rotatably supported on the rotor shaft and has a number of commutator lamellas that are disposed on the insulation material body. Connection lugs that are bent away from the commutator lamellas for connecting connection wires of the rotor winding, in order to use the advantageous ultrasonic torsion welding process to mechanically and electrically connect connection lugs and connection wires without changing the rotor geometry, the insulation material body, is axially supported against the end face of the rotor body oriented toward the end face.

2 Claims, 4 Drawing Sheets

METHOD OF PRODUCING A ROTOR FOR A COMMUTATOR MACHINE USING AN ANGLED SONOTRODE

PRIOR ART

The invention is based on a rotor for a commutator machine.

With a known rotor of this type (WO 90/04864), the connection lugs on the collector or commutator lamellas are embodied as hooks that are bent back at an acute angle to the lamellas each of whose hook bases respectively has a winding wire running around it. The electrical and mechanical connection between the winding wires and the connection lugs takes place by means of bending the hooks over and by means of ultrasonically welding the hook ends to the collector lamellas, for which a sonotrode of an ultrasonic torsion welding device is simultaneously used as a bending tool.

With a known ultrasonic torsion welding device for fastening the winding wires to the connection lugs of commutator lamellas (DE 89 02 562 U1) with a sonotrode which produces high-frequency mechanical vibrations and presses with an axial force against the wire windings of the winding wires disposed around the connection lugs, and with an anvil that supports the connection lugs during the welding process, the anvil and the free end of each connection lug are provided with support faces that absorb the sonotrode pressure and the sonotrode vibrations lateral to the pressing direction, which support faces can be placed against each other before the beginning of the welding process by means of a relative movement of the anvil and the connection lugs. The support face, which is embodied on the anvil that can be moved radial to the sonotrode axis, thereby engages behind the connection lugs of the commutator lamellas on their back side oriented away from the sonotrode and consequently absorbs the axial pressure of the sonotrode to a large extent. The sonotrode has a flat, annular welding surface, which is pressed onto the winding wires.

In both cases, the use of the ultrasonic torsion welding process requires a particular geometric embodiment of the connection lugs that contain the winding wires and this in turn requires a particular winding technique of the rotor winding. Furthermore, a certain minimum distance between the rotor body and the commutator is required in order to be able to guide the support faces of the anvil radially behind the connection lugs.

ADVANTAGES OF THE INVENTION

The rotor according to the invention, has the advantage that the ultrasonic torsion welding, with its technical manufacturing advantages, can also be used with conventional rotors, in fact with no changes or with only slight changes to the rotor geometry.

Through the support according to the invention of the complete commutator against the rotor body the commutator is secured against moving on the rotor shaft during the welding so that a separate anvil is not required to absorb the high axial forces of the sonotrode. For the possible, but not absolutely required absorption of the remaining slight axial forces acting on the connection lugs, it is sufficient to supply corresponding low-volume support faces of the anvil to the rotor shaft, for the supply of which, even in conventional rotors, there is still sufficient space between the winding heads of the rotor winding on the rotor body and the connection lugs on the commutator or by means of recesses in the rotor body.

Alternatively and independently of the geometry of the connection lugs, according to an advantageous embodiment of the invention, the connection lugs can also be supported against the insulation material body, at least in the region in which they bend away from the commutator lamellas.

By means of the alternative or additional bending, of the connection lugs by approximately 90° outward and the hook-like bending of the end of the connection lugs into a securing hook to prevent the connection wires wound around the connection lugs from slipping out during the welding process, an automatically executable hooking technique can be produced, which is quite similar to the technique in existing products. According to an advantageous embodiment of the invention, an additional wire securing for the winding process is produced by means of the T-shaped embodiment of the free end of the connection lugs.

According to an alternative or improved embodiment of the invention if wire catches are provided on the inner surfaces of the connection lugs that are bent outward by approximately 135°, which inner surfaces are oriented toward the commutator lamellas, then in conventional rotors, the previous hooking technique can be maintained, wherein the wire catches prevent the connection wires from slipping into the bottom of the bend or hook during the welding process.

A device for ultrasonic torsion welding, which takes into account the embodiment of the rotor has been set forth herein.

If the intent is to avoid changes to the connection lugs in order to stop the connection wire windings from slipping out during the welding process, then according to an alternative embodiment of the device, the wire catches can be moved from the connection lugs to the support faces of an anvil that supports the connection lugs during the welding process. To this end, according to the device for ultrasonic torsion welding, the support faces of the anvil that extend at a 45° angle to the sonotrode axis are provided with wire clamping segments and after the placement of the support faces against the outer faces of the connection lugs oriented away from the commutator lamellas, these wire clamping segments protrude beyond the inner surface of the connection lugs on at least one side of each connection lug in the vicinity of the bottom of the bend or hook enclosed with the commutator lamellas.

BRIEF DESCRIPTION OF THE DRAWINGS

The invention will be explained in detail in the description below in conjunction with exemplary embodiments depicted in the drawings. Each of the drawings is a schematic representation.

DESCRIPTION OF THE EXEMPLARY EMBODIMENTS

Figure 1:
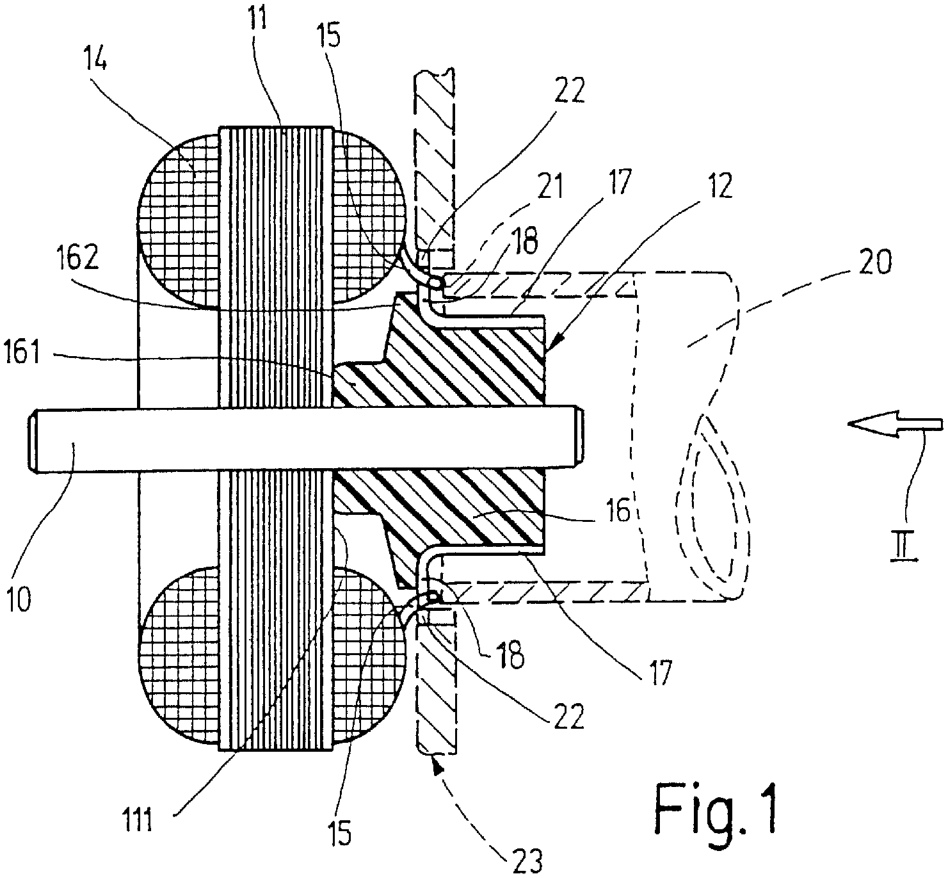
FIG. 1 shows a longitudinal section through a rotor for a commutator machine.
Figure 2:
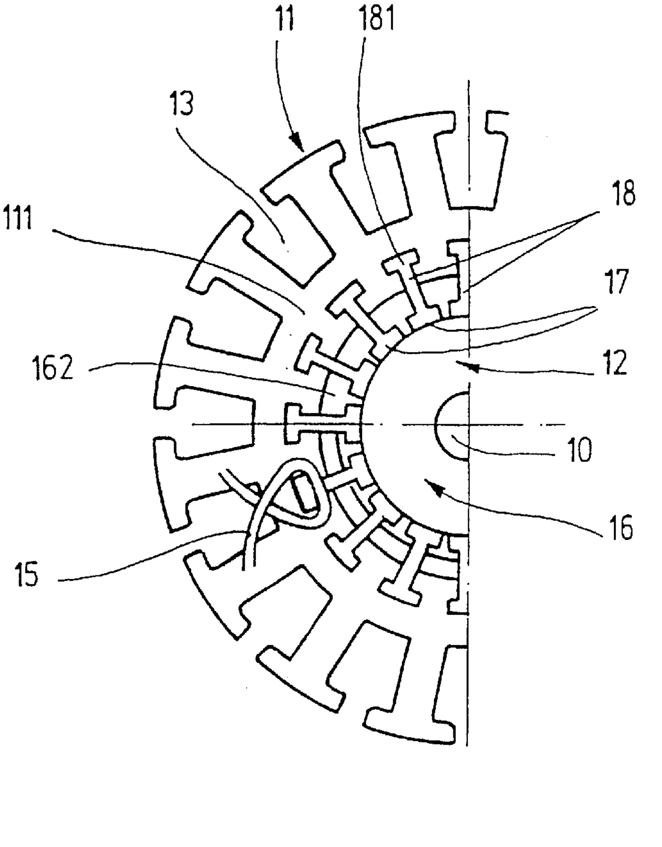
FIG. 2 shows a detail of an end face of the rotor without the rotor winding, in the direction of the arrow II in FIG. 1.

The rotor or armature for a commutator or collector machine, which is shown in a schematic, longitudinal section in FIG. 1, has a rotor shaft 10 to be rotatably supported in a machine housing, which shaft supports a rotor body 11 embodied as a laminated stack of sheets and a commutator 12. The rotor body 11 is provided with axial grooves 13 (FIG. 2) disposed distributed uniformly over the circumference, which receive an armature or rotor winding 14. The rotor winding 14 is embodied with a number of winding coils, which are electrically connected to the commutator 12 by way of connection wires 15. The commutator 12 has an insulation material body 16 non-rotatably supported on the rotor shaft 10 and has a number of collector or commutator lamellas 17 that are disposed extending axially parallel, next to one another on the insulation material body 16, with insulating gaps in its circumference direction. connection lugs 18 are respectively bent in one piece from the ends of the commutator lamellas 17 oriented toward the rotor body 11 and these connection lugs 18 protrude radially outward and support the connection wires 15. Each commutator lamella 17 of the commutator 12 is respectively connected to a winding coil of the rotor winding 14 by way of a connection wire 15. In the automatic winding of the rotor, the connection wires 15 are wound around the connection lugs 18, e.g. using the a hooking technique, as is shown for one connection lug 18 in FIG. 2. Crossbars 181 embodied on the free ends of the connection lugs 18 prevent the connection wires 15 from slipping off of the connection lugs 18.

The mechanical connection of the connection wires 15 of the rotor winding 14 to the connection lugs 18 of the commutator lamellas 17 takes place by means of an intrinsically known ultrasonic torsion welding process in which a hollow, cylindrical sonotrode 20, which is indicated with dashed lines in FIG. 1, is slid with play over the outer circumference of the commutator 12 and with a flat, annular welding surface 21 on its end face, is pressed against the connection wires 15 on the top side of the connection lugs 18. During the welding process, the sonotrode 20 executes high-frequency torsional vibrations with very small amplitudes, wherein its welding surface 21 is pressed against the connection wires 15 with an axial force of approximately 100 N, for example. So that the commutator 12 can absorb the axial forces of the sonotrode 20 during the welding process without being damaged or being moved on the rotor shaft 10, the insulation material body 16 is axially supported against the end face 111 oriented toward the end face belonging to the rotor body 11 non-rotatably supported on the rotor shaft 10. In the exemplary embodiment of FIG. 1, the support of the insulation material body 16 by means of a collar 161, which is formed in one piece onto the end face of the insulation material body 16 and whose outer diameter is reduced in comparison to that of the insulation material body 16. In addition, a radial flange 162 is also embodied on the insulation material body 16 and is used to support the connection lugs 18 in their bending region close to the commutator lamellas 17.

Figure 3:
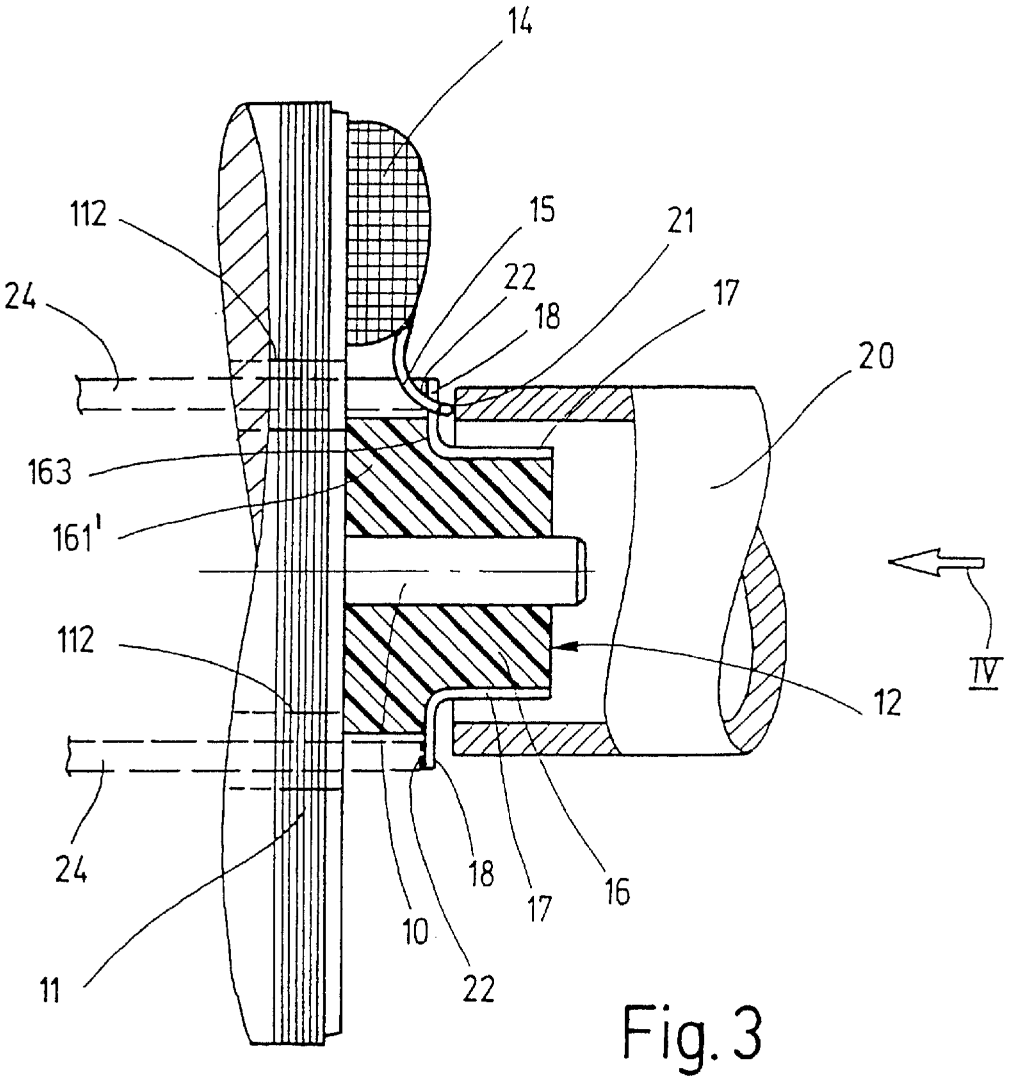
FIG. 3 shows a detail of a longitudinal section through a rotor, according to a second exemplary embodiment.
Figure 4:
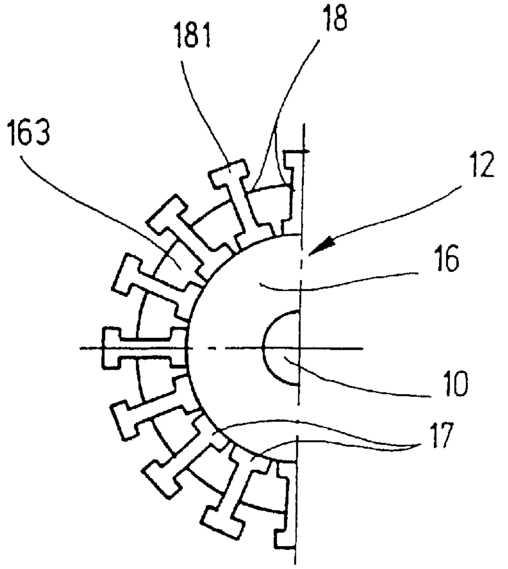
FIG. 4 shows a detail a partial end face of a commutator of the rotor in FIG. 3, in the direction of the arrow IV in FIG. 3.

In the exemplary embodiment in FIG. 3, the collar 161' is embodied with an outer diameter that is greater than the outer diameter of the insulation material body 16 so that at the transition of the sections of the insulation material body 16 with different outer diameters, a radial shoulder 163 is produced, which is used in a similar manner to support the connection lugs 18 in the bending region.

Figure 5:
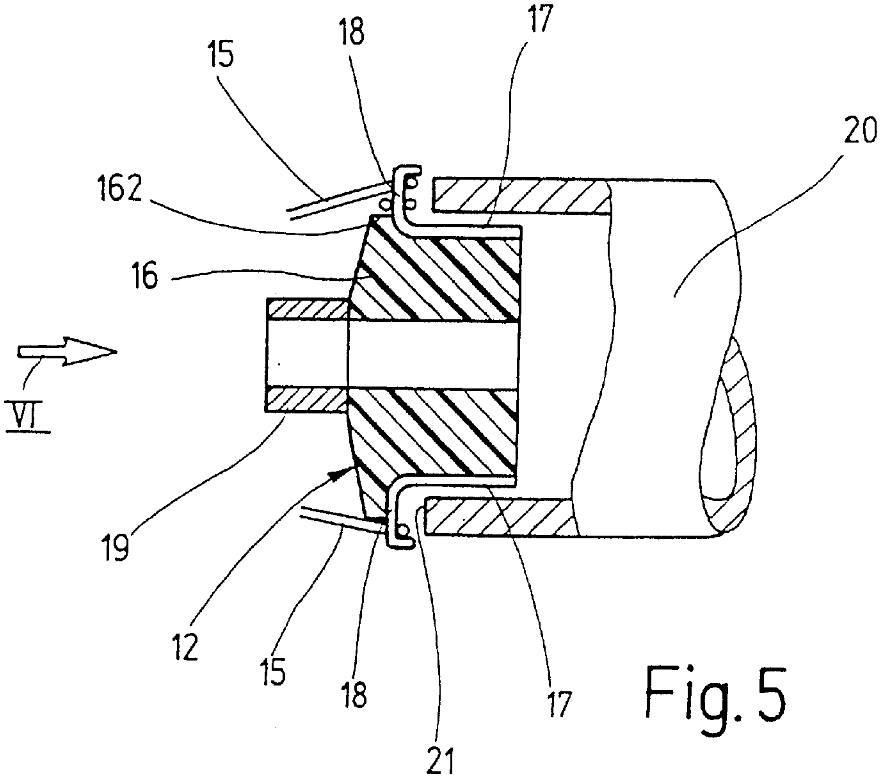
FIG. 5 shows a longitudinal section through a modified commutator for a rotor, according to a third exemplary embodiment.
Figure 6:
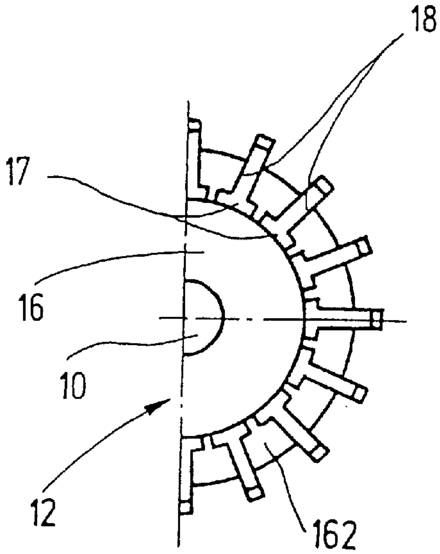
FIG. 6 shows a detail a partial end face of the commutator in the direction of the arrow VI in FIG. 5.

In the exemplary embodiment in FIG. 5, the support of the commutator 12 or the insulation material body 16 against the end face 111 of the rotor body 11 takes place by means of a support sleeve 19 made of metal, plastic, paper, or the like, which is slid onto the rotor shaft 10 and is disposed between end faces of the insulation material body 16 and rotor body 11, which are oriented toward each other. Also in this exemplary embodiment, the insulation material body 16 is provided with a radial flange 162 for supporting the connection lugs 18 in their bending region close to the commutator lamellas 17. Alternatively, the support of the insulation material body 16 against the rotor body 11 can also take place by means of a powder coating, preferably made of epoxy resin, that has partly gelled onto the insulation material body 16 or rotor body 11.

As is also indicated with dashed lines in FIG. 1, during the welding process, the connection lugs 18 can also be axially supported in the end region protruding beyond the radial flange 162 by means of support faces 22 of an anvil 23. The support faces 22 are supplied radially, to which end the anvil 23 is divided into two halves, each with a semi-annular support face 22, which extends radial to the sonotrode axis. These support faces 22, however, are only required with long, radially protruding connection lugs 18, which extend relatively far beyond the radial flange 162 and only have to absorb slight axial forces of the sonotrode 20.

In the exemplary embodiment of the rotor according to FIG. 3, in the region in which they protrude beyond the outer circumference of the insulation material body 16, the connection lugs 18 can also be supported during the welding process by means of axially supplied support faces of an anvil. These support faces 22 are constituted by the end faces of support bolts 24 which are inserted parallel to the rotor shaft 10 through recesses 112 in the rotor body 11 and are placed against the back side of the connection lugs 18 oriented toward the rotor body 11.

Figure 7:
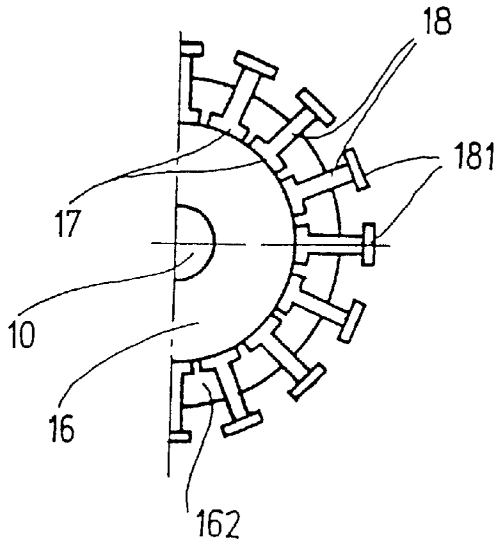
FIG. 7 shows a depiction similar to FIG. 6 of a modified commutator.

In the commutators 12 depicted in FIGS. 1–7, the connection lugs 18 are bent at right angles away from the commutator lamellas 17. On the free end of the connection lugs 18, securing means are provided in order to prevent the connection wires 15 from slipping off from the radially outward directed connection lugs 18 during the automatic winding of the rotor winding 14 with simultaneous hooking of the connection wires 15 onto the connection lugs 18. In the commutators 12 shown in FIGS. 1 and 2 as well as 3 and 4, these securing means are embodied by means of the cross-pieces 181 on the free end of the connection lugs 18. With this rotor that has been wound in the conventional manner, in order to be able to use the ultrasonic torsion welding process, it is necessary to prevent the connection wires 15 that have been placed around the connection lugs 18 from slipping during the welding process. To this end, with the commutator according to FIG. 5, the end sections 182 on the free end of the connection lugs 18 are bent like hooks so that the hooks point away from the rotor body 11. In order to produce an additional wire securing when hooking the connection wires 15, the hook-like end sections 182 can also be embodied as T-shaped, as shown in FIG. 7. When the sonotrode 20 presses against the connection wires 15, they are supported on the end sections 182 of the connection lugs 18 and consequently cannot slip out underneath the welding surfaces 21 of the sonotrode 20.

Figure 8:
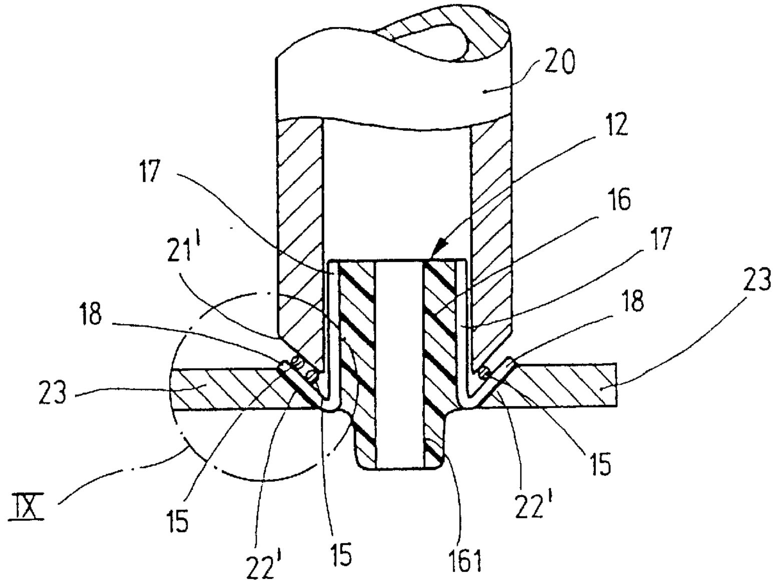
FIG. 8 shows a longitudinal section through a modified commutator of the rotor in FIG. 1, in connection with a detailed, longitudinal section through an ultrasonic torsion welding device.

In the commutator 12 shown in FIG. 8, the connection lugs 18 are bent away from the commutator lamellas 17 by a bending angle of approximately 135° so that the connection lugs 18 enclose an acute angle of approximately 45° with the commutator lamellas 17. In order to be able to use the ultrasonic torsion welding process in rotors with commutators 12 that are embodied in this manner, the sonotrode 20 of the welding device is modified to the extent that its annular welding surface 21' is inclined so that the incline encloses an angle of approximately 135° with the sonotrode axis and therefore extends approximately parallel to the inner surfaces 183 of the connection lugs 18 that point toward the commutator lamellas 17. As a result, the sonotrode 20 can reach with its welding surface 121' into the V-shaped bottom of the angle or hook between the connection lugs 18 and the commutator lamellas 17 and welds the connection wires 18 outward against the inner surface 183 of the connection lugs 18.

The axial forces of the sonotrode 20, which act on the connection lugs 18 during the welding process ^ provided that they are not absorbed by the insulation material body 16 supported against the rotor body 11 by the collar 161—are absorbed here by means of the anvil 23, which is divided into two halves and can be moved radial to the sonotrode axis. The anvil 23 has two semi-annular support faces 22' resting against the outer surface of the connection lugs 18, which enclose an angle of 45° with the sonotrode axis and therefore extend parallel to the inclined, annular welding surface 21' of the sonotrode 20.

Figure 9:
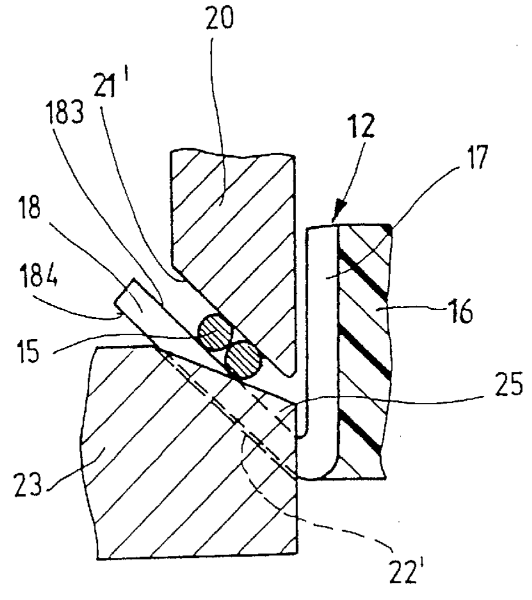
FIG. 9 shows an enlarged depiction of the detail IX in to FIG. 8.
Figure 10:
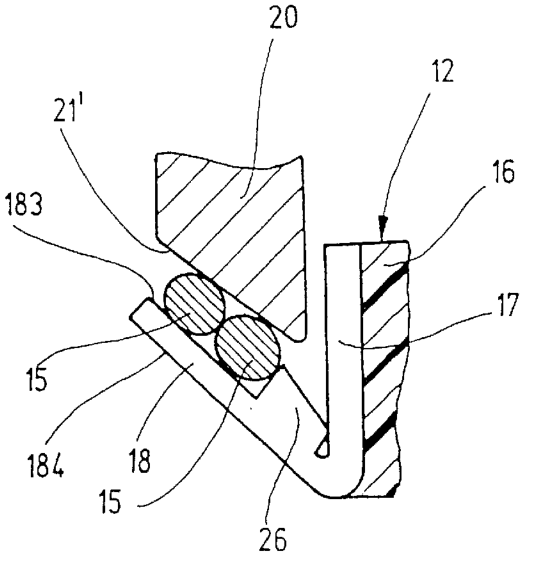
FIG. 10 shows a depiction similar to FIG. 9, with modified connection lugs of the commutator lamellas of the commutator in FIG. 8.

In order to prevent the connection wires 15, which are wound around the connection lugs 18 using the a hooking technique for example, from slipping out during the welding process, two alternative measures are taken, which are shown in FIGS. 9 and 10. In FIG. 9, the support faces 22' of the anvil 23 are provided with a number of wire clamping segments 25 and when the support faces 22' are resting against the outer surfaces 184 of the commutator lamellas 17, these clamping segments 25 protrude beyond the inner surface 183 of the connection lugs 18 on at least one side of each connection lug 18 in the vicinity of the hook bottom, so that the free gaps between the inner surfaces 183 of the connection lugs 18 and the welding surface 21' of the sonotrode 20 narrow toward the bottom of the hook and therefore prevent the connection wires 15 from slipping into the hook bottom.

In the exemplary embodiment in FIG. 10, a wire catch 26 is embodied on the inner surface 183 of all of the commutator lamellas 17, and this catch protrudes at right angles from the inner surface 183 of the connection lug 18, in the vicinity of the hook bottom formed between the connection lug 18 and commutator lamella 17 and constitutes a stop for the connection wires 15. This likewise prevents the connection wires 15 from sliding in the direction of the hook bottom.

The foregoing relates to a preferred exemplary embodiments of the invention, it being understood that other variants and embodiments thereof are possible within the spirit and scope of the invention, the latter being defined by the appended claims.

We claim:

1. A method of producing a rotor for a commutator machine, which comprises forming a rotor shaft (10), a rotor winding (14) that is contained in a rotor body (11) supported non-rotatably on the rotor shaft (10), and a commutator (12), forming an insulation material body (16) non-rotatably supported on the rotor shaft (10) and has a number of commutator lamellas (17) that are disposed extending axially parallel with such housing lamella end, next to one another on the insulation material body (16), with insulating gaps in a circumference direction, and with a connection lug (18) respectively bent at an angle of approximately 45 degrees from each of the lamella ends and is oriented axially with an inner surface (183) toward the lamella supporting the insulation material body (16) against an end face (111) of the rotor body (11) oriented toward the insulation material body, further comprising the steps of winding connection wires (15) of the rotor windings (14) around the connection lugs (18), pressing a sonotrode (20) coaxial to the rotor shaft 10 and having an annular welding surface (21') embodied on an end face of the sonotrode concentric to commutator axis and inclined so that the inclined welding surface encloses an angle of approximately 135° with a sonotrode axis thereby extends approximately parallel to the inner surface (183) of the connection lugs (18) oriented toward the commutator lamellas (17) against the connection wires (15) and produces high-frequency mechanical rotary vibrations with the sonotrode for ultrasonically torsion welding the winding wires (15) to the connection lugs (18).

2. The method according to claim 1, which comprises moving an anvil (23) radial to the sonotrode axis with support faces (22') extending at an angle of approximately 45° in relation to the sonotrode axis for placement against the outer surface (184) of the connection lugs (18) oriented away from the commutator lamellas (17) during welding the winding wires (15) to the connection lugs (18).

* * * * *